US008118653B2

(12) United States Patent
Langridge

(10) Patent No.: US 8,118,653 B2
(45) Date of Patent: Feb. 21, 2012

(54) TAKING COVER IN A SIMULATED ENVIRONMENT

(75) Inventor: Adam J. Langridge, Guildford (GB)

(73) Assignee: Microsoft Corporation, Redmond, WA (US)

(*) Notice: Subject to any disclaimer, the term of this patent is extended or adjusted under 35 U.S.C. 154(b) by 898 days.

(21) Appl. No.: 12/139,516

(22) Filed: Jun. 16, 2008

(65) Prior Publication Data

US 2009/0311652 A1 Dec. 17, 2009

(51) Int. Cl.
*A63F 9/02* (2006.01)
*A63F 13/10* (2006.01)

(52) U.S. Cl. .............................. 463/7; 463/23

(58) Field of Classification Search .......... 273/1; 463/1, 463/7, 23, 30, 36
See application file for complete search history.

(56) References Cited

U.S. PATENT DOCUMENTS

| 5,787,333 | A | * | 7/1998 | Rasinski et al. | 434/4 |
|---|---|---|---|---|---|
| 5,853,324 | A | | 12/1998 | Kami et al. | |
| 6,017,272 | A | | 1/2000 | Rieder | |
| 6,424,353 | B2 | | 7/2002 | Yamamoto et al. | |
| 6,454,652 | B2 | | 9/2002 | Miyamoto et al. | |
| 6,918,829 | B2 | | 7/2005 | Ikariko | |
| 7,094,153 | B2 | * | 8/2006 | Kunieda et al. | 463/32 |
| 8,016,672 | B2 | * | 9/2011 | Suzuki et al. | 463/30 |
| 2006/0284373 | A1 | | 12/2006 | Kenney et al. | |
| 2007/0238528 | A1 | | 10/2007 | Harris et al. | |
| 2007/0262999 | A1 | * | 11/2007 | Bridger et al. | 345/473 |

FOREIGN PATENT DOCUMENTS

EP 0676612 A1 10/1995
WO WO 2007134115 A2 * 11/2007

OTHER PUBLICATIONS

Gears of War [Game Manual]. (2006), Epic Games.*
The Infantry Platoon and Squad (Infantry, Airborne, Air Assault, Ranger) (Dec. 31, 1980), United States Department of the Army.*
TheRealLurlock, "Morrowind:Block". (Jan. 16, 2007), UESPWiki url:<http://www.uesp.net/wiki/Morrowind:Block>.*
"Shield", Wikipedia. (No Date) url:<http://en.wikipedia.org/wiki/Shield>.*
"Messiah (video game)", Wikipedia (No Date) url:<http://en.wikipedia.org/wiki/Messiah_(video_game)>.*
Van Leuvern, Luke, "E3 2006: Gears of War Hands-on," available at <<http://palgn.com.au/article.php?id=4555>>, May 11, 2006, 2 pages.
Miller, Jonathan, "Gears of War Review," available at <<http://uk.xbox360.ign.com/articles/744/744356p1.html>>, Nov. 7, 2006, 3 pages.

(Continued)

*Primary Examiner* — Peter DungBa Vo
*Assistant Examiner* — Michael D Brothers
(74) *Attorney, Agent, or Firm* — Alleman Hall McCoy Russell & Tuttle LLP

(57) ABSTRACT

An approach is described for instructing a player character to automatically take cover in a region of a simulated environment without receiving express commands from a user. The approach determines whether the player character should take cover based on one or more factors. Such factors may include: the presence of an enemy-type character in the region; the presence of a nearby object in the region that can be used to seek cover; and a determination whether the player character's behavior is consistent with a decision to seek cover.

20 Claims, 9 Drawing Sheets

OTHER PUBLICATIONS

Onyett, Charles, "Epic's Beast Finally Tears up the PC," available at <<http://videogames.yahoo.com/pc/gears-of-war/review-1166660>>, Nov. 2007, 3 pages.

Qualls, Eric, "Gears of War Review (X360)," About.com: XBox Games, available at <<http://xbox.about.com/od/xbox360reviews/fr/gearsofwarrev.htm>>, 2 pages.

Treit, Ryan, "Gameplay Mechanics of Mass Effect," available at <<http://www.xbox.com/en-US/games/m/masseffect/20071203-gameplaymechanics.htm>>, Dec. 3, 2007, 6 pages.

"Mass Effect Tips and Hints: Combat Tips," available at <<http://www.gamespot.com/features/6183235/p-2.html>>, copyright 2008, 3 pages.

* cited by examiner

TAKING COVER IN A SIMULATED ENVIRONMENT

BACKGROUND

Computer games provide a simulated environment that may provide an opportunity for a character to take cover using an object in the simulated environment. For example, consider the case of a computer game that enables characters to engage in simulated combat. A user may control a player's character (henceforth referred to as a "player character") so that the player character takes cover behind a wall or other object. This tactic helps conceal the player character from one or more enemy-type characters in the vicinity. Ultimately, this tactic may prevent the player character from being successfully fired upon by the enemy-type characters.

Computer games allow a user to take cover by entering commands through a game controller. For example, a game controller may provide a special-purpose button that commands a player character to take cover behind a nearby object. A game may alternatively require the user to manually maneuver the player character to a crouch posture. This type of game may then require the user to select a cover-providing object, e.g., by motioning towards the object using a stick-type input device.

The above approaches are not fully satisfactory. For instance, a user may find the process of taking cover relatively complex and cumbersome, impeding the user's enjoyment of the game.

SUMMARY

An illustrative approach is described for instructing a player character to automatically take cover in a simulated environment without receiving express commands from a user. The approach involves determining whether the player character should take cover based on one or more factors. Such factors may include: the presence of an enemy-type character in a region in which the player character is operating; the presence of a nearby object that can be used to provide cover; and a determination of whether the player character's behavior is consistent with a decision to seek cover.

The player character's behavior with respect to cover can be gauged based on the type of weapon that the player character has unsheathed or otherwise has shown intent of using. For instance, the player character is determined to show no intent of seeking cover if it is using a close-quarter-type weapon (e.g., a sword, club, etc.). The player character is determined to be receptive to seeking cover if it is using a ranged-type weapon (e.g., a pistol, rifle, crossbow, etc.).

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for controlling a player character in a simulated environment, such as, but not limited to, a simulated world provided by a computerized game. The approach entails automatically instructing the player character to take cover using an object in the simulated environment. By virtue of this automated operation, the approach may simplify the control of the player character, potentially making the user's gaming experience more enjoyable. More generally, the concepts disclosed herein may address one or more of the challenges or problems previously noted, but are not limited to addressing all or any of these challenges or problems.

This disclosure is organized as follows. Section A describes an illustrative system for controlling a player character in a simulated environment. Section B describes illustrative methods for performing the same function. Section C describes illustrative processing functionality that can be used to implement any aspect of the features described in Sections A and B.

Figure 15:
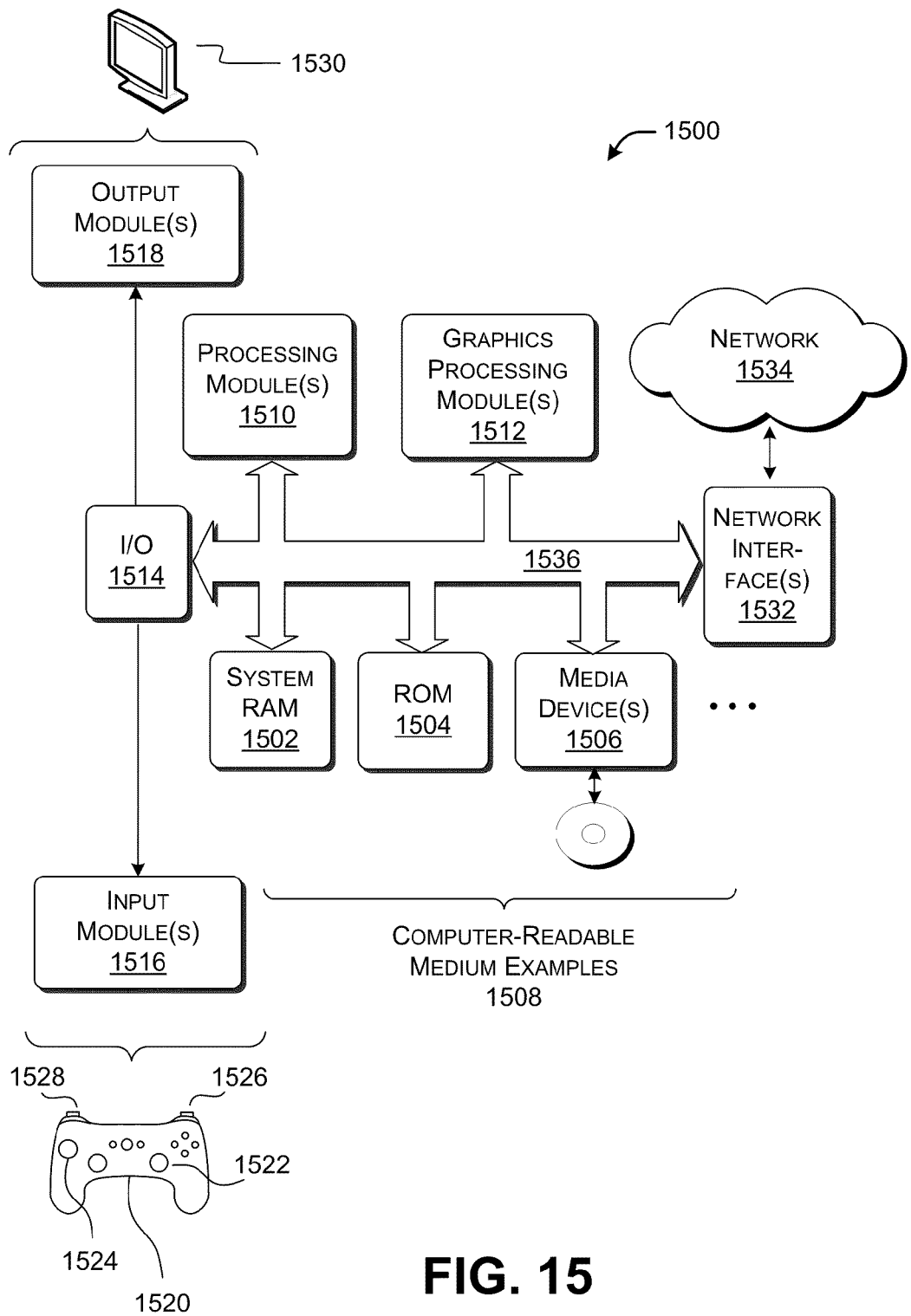
FIG. 15 shows illustrative processing functionality that can be used to implement any aspect of the features shown in the foregoing drawings.

As a preliminary matter, some of the figures describe the concepts in the context of one or more components, variously referred to as functionality, modules, features, elements, etc. The various components shown in the figures can be implemented in any manner, for example, by software, hardware, firmware, manual processing operations, and so on, or any combination of these implementations. In one case, the illustrated separation of various components in the figures into distinct units may reflect the use of corresponding distinct physical components. Alternatively, or in addition, any single component illustrated in the figures may be implemented by plural physical components. Alternatively, or in addition, the depiction of any two or more separate components in the figures may reflect different functions performed by a single physical component. FIG. 15, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein. The blocks shown in the flowcharts can be implemented by software, firmware, hardware, manual processing, any combination of these implementations, and so on.

A. Illustrative Systems

Figure 1:
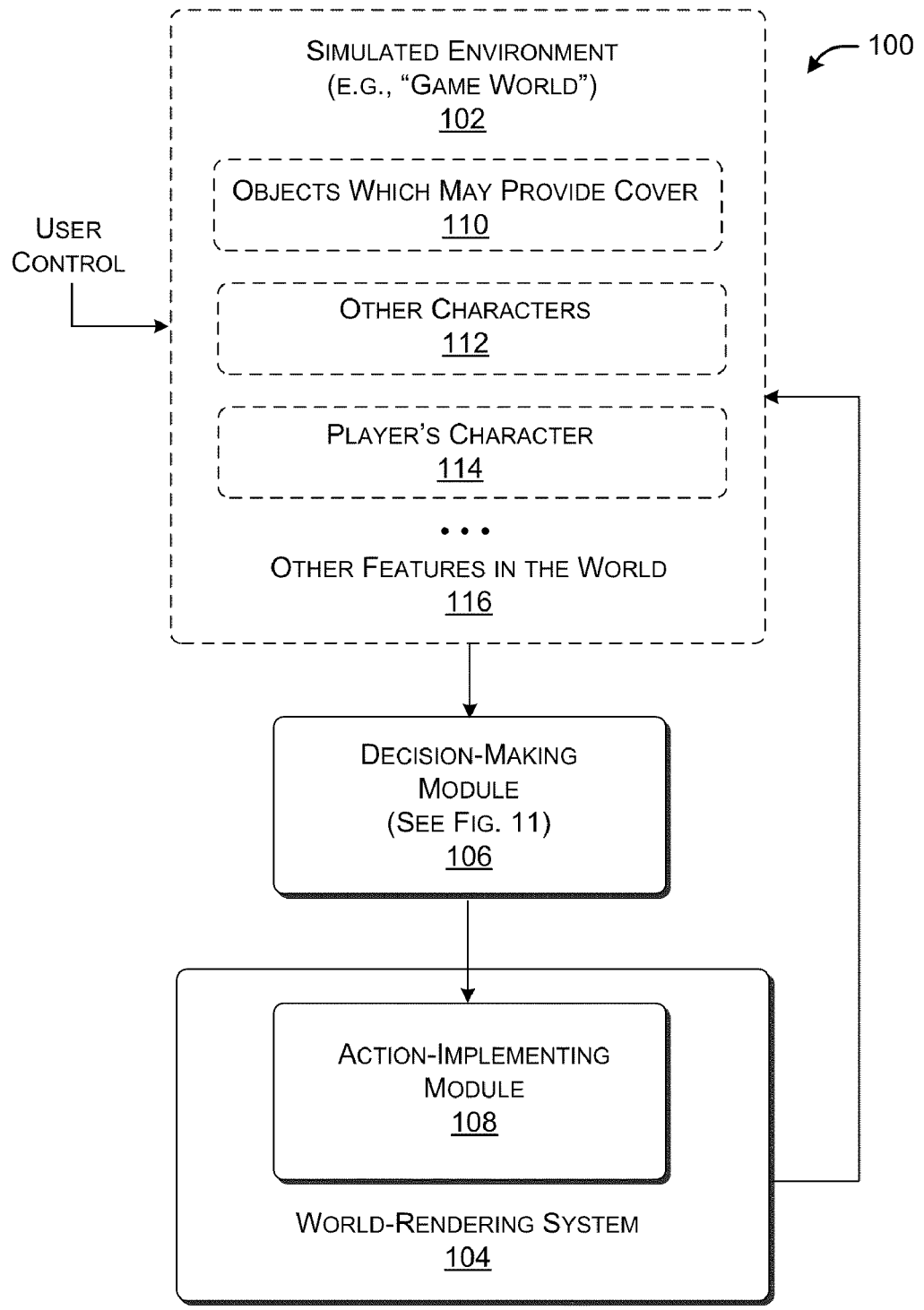
FIG. 1 shows an illustrative system for controlling the actions of a player character in a simulated environment.

FIG. 1 shows an illustrative system 100 for controlling a character in a simulated environment 102. In one case, the simulated environment 102 pertains to a simulated game world provided by a computerized game. The following concepts will be described primarily in such a game-related context. However, the concepts are also applicable to other types of simulated environments. For example, the concepts are applicable to various types of simulation systems used for training purposes, such as a system for training law enforcement officers in the handling of threats.

A user may control events within the simulated environment 102 by entering various instructions. For example, through this input, the user may control the actions taken by a character, referred to herein as a "player character."

The system 100 includes a world-rendering system 104 for generating the simulated environment 102. The world-rendering system 104 may include any type of graphical pipeline for rendering the simulated environment 102, implemented using any type of technology (such as, but not limited to, DirectX® technology provided by Microsoft® Corporation of Redmond, Wash.). The world-rendering system 104 is controlled by a decision-making module 106, which, in turn, responds to events in the simulated environment 102. Through this control, the decision-making module 106 automatically governs the behavior of the player character based upon various situations that the player character encounters in the simulated environment 102.

The world-rendering system 104 may also populate the simulated environment 102 with other types of characters under the control of the decision-making module 106. These other types of characters may act as friends or foes to the player character. Characters that act as friends to the player character are referred to herein as "friend-type characters." Characters that act as foes to the player character are referred to as "enemy-type characters." Any character in the simulated environment 102 can take on any personae, such as a human being, an animal, a mythical creature, and so on.

A computerized game in the combat genre provides one type of simulated environment 102. In this environment, the player character is often pitted against one or more enemy-type characters. The player character may advance through the game by attempting to attack the enemy-type characters. In addition, or alternatively, the player character may seek to avoid being attacked by the enemy-type characters. The characters may engage in combat using various weapons, including various kinds of ranged-type weapons and close-quarter-type weapons. A ranged-type weapon refers to a weapon that can be used to attack an enemy-type character by shooting at the enemy-type character from a distance. Ranged-type weapons includes hand guns, rifles, cross bows, and so on. A close-quarter-type weapon refers to a weapon that can be used in close-contact fighting with an enemy-type character (such as hand-to-hand-type combat, also known as melee-type fighting). Close-quarter-type weapons include swords, knives, clubs, and so on.

In a combat environment, the player character may find it useful to seek cover using an object in the simulated environment 102. For instance, a player character may find it useful to seek cover so as to reduce its visibility to enemy-type characters. Various types of objects in the simulated environment 102 can be used to provide cover, such as walls, buildings, vehicles, barrels, trees, rocks, high grass, and so on. No limitation is placed on the types of objects that can be used to provide cover. A player character may use the cover in various ways. In one case, the character can crouch or duck behind the cover. In another case, the player may lie substantially prone behind the cover. In another case, the player may lean against the cover. In another player may assume a "hands and knees" posture behind the cover, and so on. No limitation is placed on the types of actions that the player character may take with respect to an object that provides cover. However, to facilitate discussion, the concealment behavior of the player character will generally be described herein as crouching and ducking.

Among other functions, the decision-making module 106 includes functionality for controlling the cover-seeking behavior of the player character. Generally stated, the decision-making module 106 controls the cover-seeking behavior by identifying and analyzing contextual factors regarding a current state of game play which may warrant the player character taking cover. If the decision-making module 106 determines that it is appropriate for the player character to take cover, it will generate an instruction to that effect. An action-implementing module 108 receives this instruction and carries out the desired cover-seeking behavior. For instance, the action-implementing module 108 may cause the player character to take cover using an object, such as by crouching behind the object.

In one implementation, the action-implementing module 108 controls the covering-behavior without receiving any express commands from the user. In one case, for instance, the user may move the player character near an object that may provide cover. The decision-making module 106 and the action-implementing module 108 take over from there, automatically generating the cover-seeking behavior if the prevailing circumstances are determined to warrant such an action. The user is thus relieved of having to expressly instruct the player character to take cover using his or her game controller. This may result in a more enjoyable gaming experience for the user by simplifying the control of the player character.

The decision-making module 106 makes a decision regarding whether it is appropriate to seek cover based on various contextual factors associated with the region in which the player character is operating. For instance, the decision-making module 106 may identify objects in the region that can potentially be used to provide cover. FIG. 1 shows this aspect of the simulated environment 102 as feature 110. The decision-making module 106 may also identify potential threats in the region, such as the presence of one of more enemy-type characters. FIG. 1 shows this aspect of the simulated environment as feature 112. The decision-making module 106 may also identify the behavior of player character itself. FIG. 1 shows this aspect of the simulated environment 102 as feature 114. For example, as will be discussed, the player character may take various actions (such as the selection of specific types of weapons) which reveal its intent to confront an enemy-type character, rather than take cover. The decision-making module 106 can also analyze various other features in the simulated environment 102, generically noted in FIG. 1 as features 116. The decision-making module 106 may use all (or part) of the above-described information collected from the simulated environment 102 in deciding whether it is appropriate for the player character to seek cover.

Figure 11:
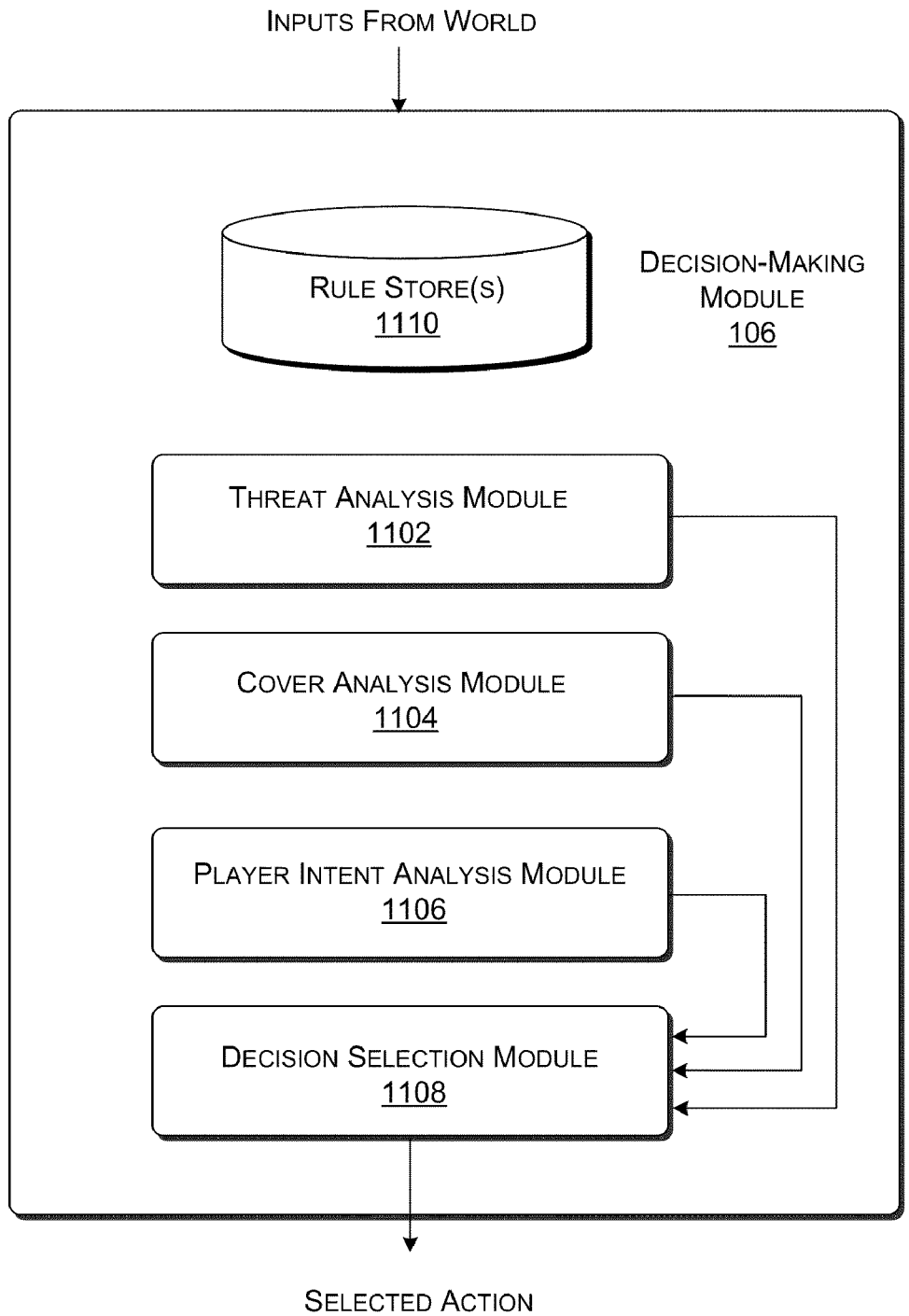
FIG. 11 shows a more detailed illustrative depiction of a decision-making module used in the system of FIG. 1.

FIG. 11 provides additional details regarding one implementation of the decision-making module 106. Prior to describing that figure, this disclosure sets forth a series of examples of the operation of the decision-making module 106. That is, these examples explain how the decision-making module 106 can be used to resolve various scenarios in the simulated environment 102. It should be noted that these examples are representative and non-limiting. The decision-making module 106 can control the player character in different ways by adopting different respective sets of rules.

Figure 2:
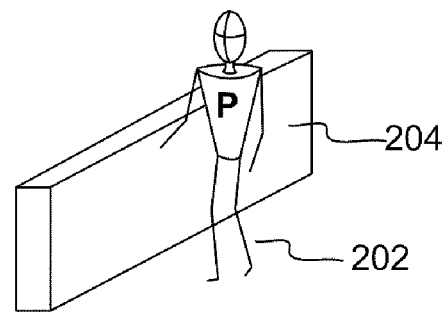
FIG. 2 is shows an illustrative disposition of a player character with respect to an object that may provide cover; in this scenario, there are no other characters in the vicinity of the player character, and thus the player character makes no attempt to seek cover.

FIG. 2 shows the case in which the user has moved a player character 202 near an object 204 that may provide cover. (The player character 202 is identified by the letter "P" on its torso.) In the illustrated case, the object 204 is a chest-high wall that the player character 202 can potentially crouch or duck behind. In this scenario, there are no other characters in the region. Hence, the decision-making module 106 determines that there are no threats in the region. And hence, the decision-making module 106 does not instruct the player character 202 to seek a cover posture.

Figure 3:
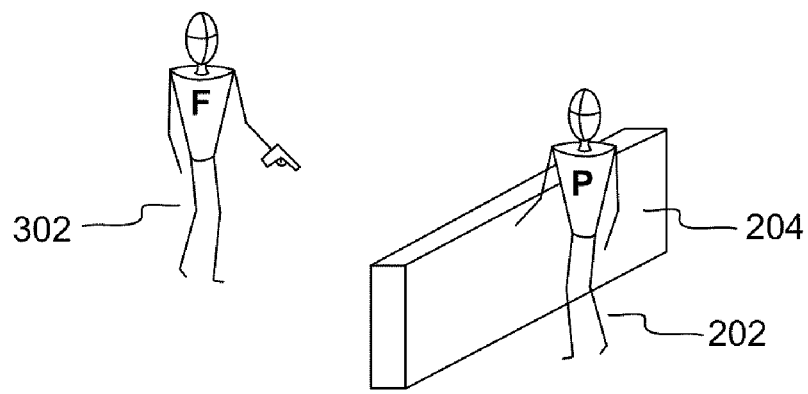
FIG. 3 shows an illustrative disposition of the player character with respect to the object upon the appearance of a friend-type character; in this situation, the player character makes no attempt to seek cover.

FIG. 3 shows the same scenario outlined with respect to FIG. 1; namely, the player character 202 is standing near the object 204. In this case, however, another character 302 has moved into the region. It is determined that this character 302 is a friend-type character with respect to the player character 202. (Here, the "F" on the friend-type character's torso identifies it as a friend.) Hence, the decision-making module 106 determines that there are no threats in the region. And hence, the decision-making module 106 does not instruct the player character 202 to seek a cover posture.

Figure 4:
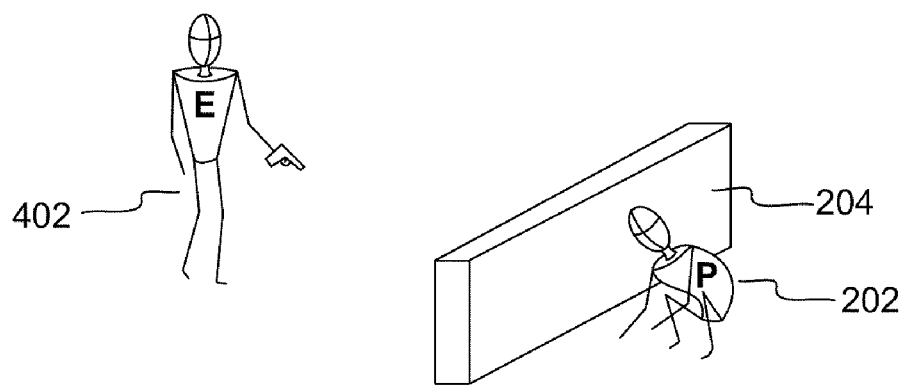
FIG. 4 shows an illustrative disposition of the player character with respect to the object upon the appearance of an enemy-type character; in this situation, the player character seeks cover.

FIG. 4 shows a similar situation to that outlined with respect to FIG. 1; namely, the player character 202 is standing near the object 204 and at least one other character 402 has moved into the region. But in this case, the other character 402 is an enemy-type character with respect to the player character 202. (Here, the "E" on the enemy-type character's torso identifies it has an enemy). In this case, the decision-making module 106 determines that there is in fact a threat in the region—namely the enemy-type character 402 brandishing a weapon. In response, the decision-making module 106 instructs the action-implementing module 108 to automatically move the player character 202 to a crouch posture behind the object 204. Although not shown, the user may subsequently move the player character 202 away from the object 204. If moved a significant distance away from the object 204, then the cover provided by the object 204 will no longer be effective. In such a scenario, the decision-making module 106 may instruct the player character 202 to resume a non-cover stance, such as by standing up.

As noted above, the action-implementing module 108 can instruct the player character 202 to perform other types of cover-seeking behavior (besides crouching). For instance, the action-implementing module 108 can instruct the player character 202 to assume the postures of ducking, knelling, lying down, leaning against, and so on. The type of action that is taken may also depend, in part, on the type of object that the player character 202 is seeking cover behind (or, more generally, with respect to). For example, the action-implementing module 108 may instruct the player character 202 to duck or crouch behind an object that is shorter than the player character 202. The action-implementing module 108 may instruct the player character 202 to stand upright and pressed against a tall and narrow object (such as a tree trunk). The action-implementing module 108 may instruct the player character 202 to assume a "hands-and-knees" crawling posture with respect to an extended low-covering object (such as tall grass), and so on.

In any case, in one implementation, the cover-seeking behavior provided by the action-implementation module 108 changes the posture of the player character 202, but does not substantially change the position of the player character 202 as a whole in the simulated environment 102. For example, the player character 202 can be conceptualized as having an X, Y, and Z position within the simulated environment 102. The action-implementation module 108 does not substantially alter the X, Y, and Z placement of the player character 202 in the simulated environment 102; it merely changes the posture of the player character 202 generally about that X, Y, and Z position.

Figure 5:
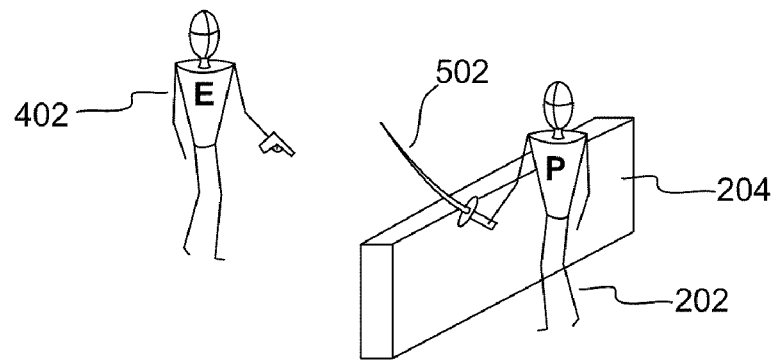
FIG. 5 shows a variation of the scenario of FIG. 4; in this illustrative situation, the player character is brandishing a close-quarter-type weapon (e.g., a sword), and therefore ceases the use of cover.

Advancing to FIG. 5, this figure shows a similar situation to that outlined with respect to FIG. 4; namely, the player character 202 is standing near the object 204, and at least one other enemy-type character 402 has moved into the region. But in this case, the player character 202 is engaging in behavior which reveals that it does not wish to seek cover. In this specific case, the player character 202 has drawn a close-quarter-type weapon 502, e.g., a sword. A sword is weapon which indicates that the user is interested in engaging the enemy-type character 402 in melee-type combat. In response, the decision-making module 106 does not instruct the player character 202 to seek cover. Alternatively, assume that the player character 202 is already in a cover posture and then unsheathes a close-quarter-type weapon. In this case, the decision-making module 106 may instruct the player character 202 to assume a non-cover stance, e.g., by standing up to confront the enemy-type character 402.

Figure 6:
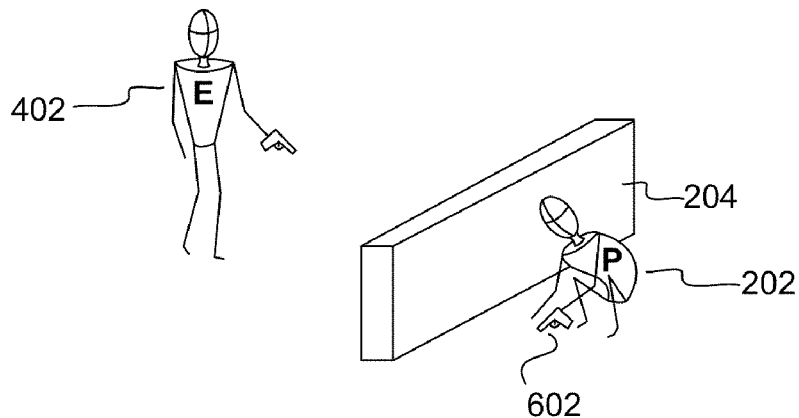
FIG. 6 shows a variation of the scenario of FIG. 4; in this illustrative situation, the player character is using a ranged-type weapon (e.g., a gun), and therefore continues the use of cover.

FIG. 6 shows a similar scenario to that illustrated in FIG. 5. In this case, however, the player character 202 has drawn a ranged-type weapon 602, instead of a close-quarter-type weapon. In this case, the ranged-type weapon 602 is a pistol. The use of a ranged-type weapon 602 is consistent with the player character's 202 intent to remain concealed (since the player character 202 can engage in combat using the ranged-type weapon 602 from a concealed posture). In response to this determination, the decision-making module 106 instructs the player character 202 to assume a cover posture upon the approach of the enemy-type character 402. Or assume that the player character 202 is already in a cover posture and unsheathes its pistol; this action will not prompt the decision-making module 106 to move the player character 202 out of the cover posture.

Figure 7:
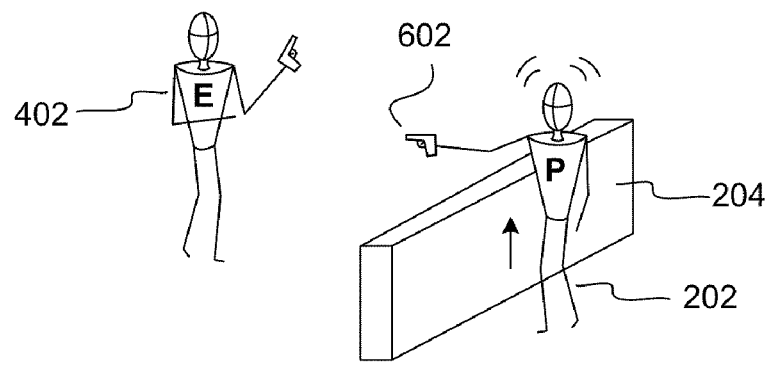
FIG. 7 shows a variation of the scenario of FIG. 6; in this illustrative situation, the player character temporarily removes itself from cover to shoot its ranged-type weapon, after which the player character is returned to a cover posture.

FIG. 7 shows the same scenario outlined with respect to FIG. 6. Here, the player character 202 has unsheathed his ranged-type weapon 602 while hiding behind the object 204. Now assume that the user instructs the player character 202 to fire the ranged-type weapon 602. The decision-making module 106 and the action-implementing module 108 may respond by temporarily instructing the player character 202 to assume a non-cover posture in order to fire the ranged-type weapon 602. After the ranged-type weapon 602 is fired, the decision-making module 106 and the action-implementing module 108 may return the player character 202 to its crouching cover posture.

Figure 8:
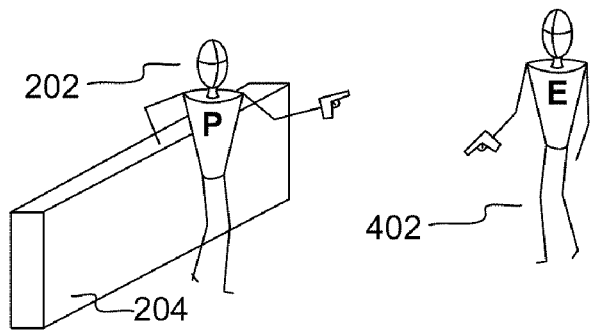
FIG. 8 shows a variation of the scenario of FIG. 4; in this illustrative situation, the enemy-type character is assumed to have seen the player character, and thus, the player character makes no attempt to seek or maintain cover.

FIG. 8 shows a scenario in which the player character 202 is again standing near an object 204 that may provide cover, with at least one enemy-type character 402 in the region. In this case, however, the enemy-type character 402 is positioned with respect to the player character 202 such that the object 204 cannot conceal the player character 202 at its present position. Various application-specific rules can be used to address this scenario. In one case, the decision-making module 106 will not instruct the player character 202 to assume a cover posture, since such a posture would not be effective in concealing the player character 202. In another case, the decision-making module 106 will instruct the player character 202 to assume a cover posture based on the reasoning that doing so may reduce the area of the target offered by the player character 202.

Figure 9:
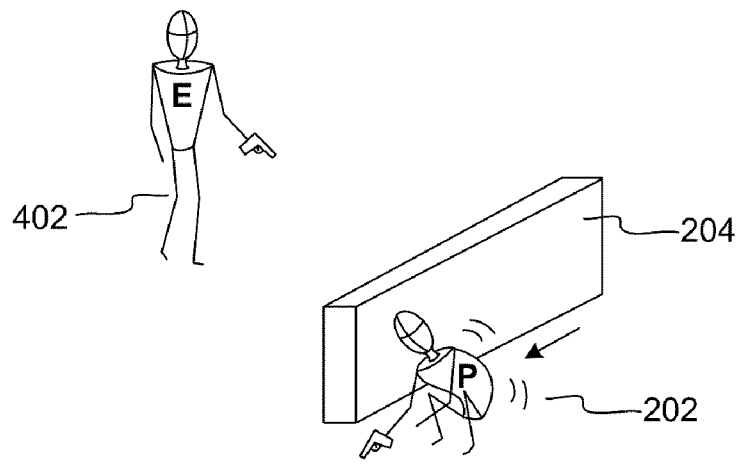
FIG. 9 shows an illustrative movement of the player character in response to the user's instruction to advance the player character while that character is in a cover posture.

FIG. 9 shows a scenario in which the player character 202 has sought cover behind the object 204 with an enemy-type character 402 lurking nearby. In this case, the user instructs the player character 202 to move along the base of the object 204. In this case, the action-implementing module 108 can execute the instruction by advancing the player character 202 along the base of the object 204 while maintaining a crouched posture. If the user moves the player character 202 beyond the distal end of the object 204, then the decision-making module 106 may instruct the player character 202 to assume a non-cover posture, e.g., by standing up.

Figure 10:
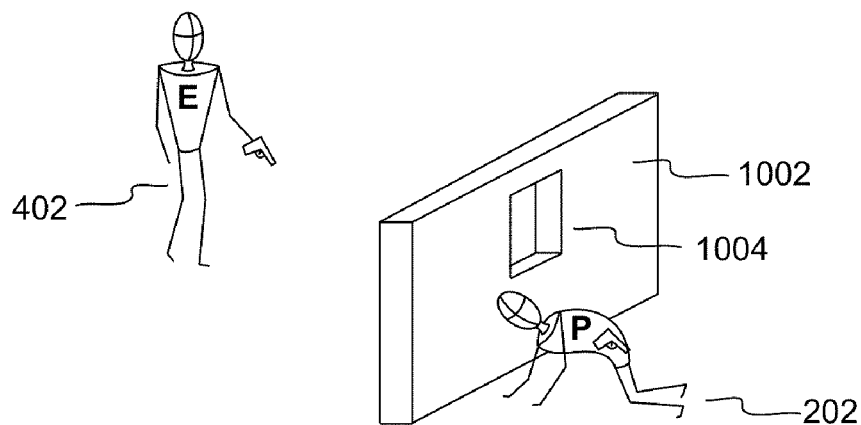
FIG. 10 shows an illustrative way in which a player character can take cover beneath a window.

Finally, FIG. 10 illustrates a scenario that shows how the player character 202 may interact with another type of object. In this case, the user has maneuvered the player character 202 near the base of a wall object 1002 having a window 1004 in it. The user is further advancing the player character 202 along the base of the wall object 1002. In this case, the decision-making module 106 can instruct the player character 202 to duck or crouch down as it passes by the window 1004. This action helps prevent the enemy-type character 402 from detecting the presence of the player character 202 as it passes the window 1004.

The above scenarios correspond to cases in which a single player character 202 encounters a single enemy-type character 402, with a single object (204, 1002) in the region which may provide cover. In other situations, there may be multiple enemy-type characters in the region and/or multiple objects that may provide cover. In these circumstances, the decision-making module 106 can apply various rules for governing the cover-seeking behavior of the player character 202. In one case, the decision-making module 106 can assess all the threats within the region. The decision-making module 106 can also identify all the possible cover-taking actions that the player character 202 can potentially take. The decision-making module 106 can assess the extent to which each of these actions will mitigate the threats, and then choose the option which is most effective in mitigating the prevailing threats.

FIG. 11 shows one illustrative implementation of the decision-making module 106 used in the system 100 of FIG. 1. The decision-making module 106 includes, or can be conceptualized to include, a number of component modules for performing different functions.

As one such component module, the decision-making module 106 includes a threat analysis module 1102. The threat analysis module 1102 determines the presence of any threats in a region of interest within the simulated environment 102. The threat analysis module 1102 can operate by determining whether there are any characters in the region (besides the player character), and, if so, whether these characters are friends or foes.

The threat analysis module 1102 can define the region of interest in different ways. In one case, the threat analysis module 1102 determines the current position of the player character in the simulated environment 102. Based on this location information, the threat analysis module 1102 determines a region of the simulated environment 102 that is appropriate to consider when deciding whether or not to instruct the player character to seek cover. In one case, the threat analysis module 1102 can define such a region as a sphere having a prescribed radius about a center corresponding to the player character's position.

In other cases, the threat analysis module 1102 can take various scene-dependent factors into account when determining the region of interest. For instance, the threat analysis module 1102 can select the region of interest so that it encompasses all the characters who can potentially see the player character. In this implementation, for instance, the threat analysis module 1102 can identify a smaller region of interest in a scene in which fog already obscures the visibility of characters (relative to a scene in which there is no impairment of visibility).

The decision-making module 106 can also include a cover analysis module 1104. The cover analysis module 1104 determines objects that can possibly be used by the player character to seek cover. The cover analysis module 1104 can use any criterion or criteria in making this determination. In one case, the cover analysis module 1104 can identify all objects within a predetermined distance of the player character. Thus, the user can influence the selection of objects by deliberately moving the player character close to an object that can provide cover. Alternatively, or in addition, the cover analysis module 1104 can provide more dynamic analysis to determine whether nearby objects can provide cover. For example, the cover analysis module 1104 can determine whether an object within a prescribed distance from the player character will be effective in occluding a line of sight between an enemy-type character and the player character. If not, the cover analysis module 1104 does not consider this object as capable of providing viable cover.

A player intent analysis module 1106 determines whether the player's actions have a bearing on whether cover should be taken. As explained above, for instance, a player may unsheathe a close-quarter-type weapon. This is indicative of the player character's intent to not seek cover, since such a weapon cannot be effectively used from a hiding posture.

Figure 14:
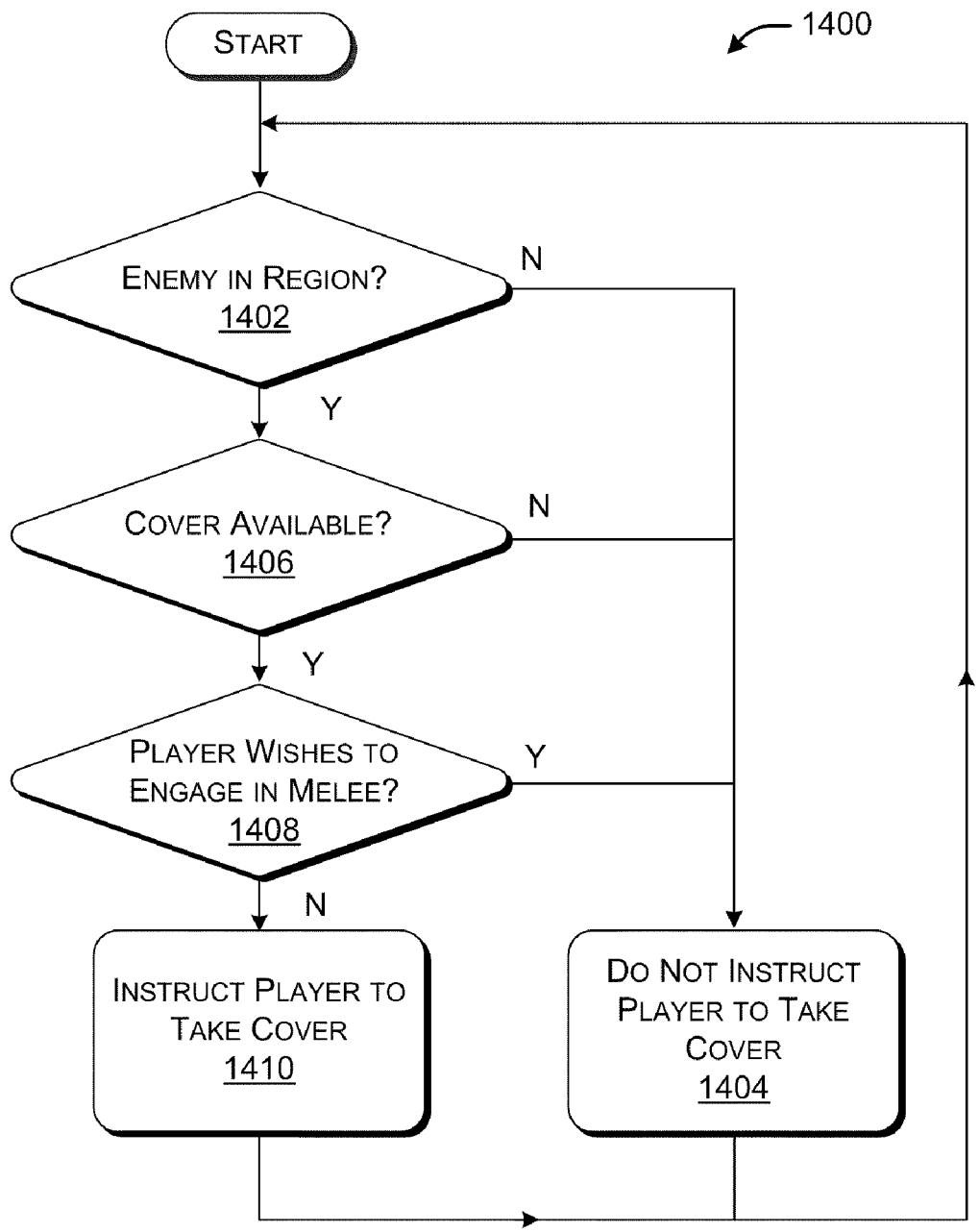
FIG. 14 is an illustrative procedure that explains analysis that can be performed by the decision-making module of FIG. 11.

A decision selection module 1108 accepts the analysis results from each of the above-described analysis modules. Based these results, the decision selection module 1108 decides whether it is appropriate to instruct the player character to seek cover or not. The decision selection module 1 108 can perform this task in the manner that was set forth above when discussing the illustrative scenarios of FIGS. 2-10. FIG. 14, to be discussed in turn, provides additional explanation regarding the operation of the decision selection module 1108.

In one case, the decision-making module 106 can perform the above-described analysis by applying a collection of rules. The rules may be stored in one or more rule stores 1110. The rules can be structured in any format, such as an IF- THEN-type format. Alternatively, or in addition, the decision-making module 106 can also apply artificial intelligence functionality in making cover-seeking decisions. Alternatively, or in addition, the decision-making module 106 can employ a learning engine which records the behavior of a user while using the game and identifies patterns in the user's behavior. The decision-making module 106 can apply such patterns to automatically invoke covering-seeking behavior which may better conform to the user's preferences in controlling the player character. Still other implementations of the decision-making module 106 are possible.

In one implementation, the user may be given the option of activating and deactivating the automatic cover-seeking behavior provided the decision module 106. In the case that the cover-seeking behavior is deactivated, the user may manually control the cover-seeking behavior of the player character. Alternatively, or in addition, the system 100 can simultaneously accommodate automatic cover-seeking behavior and manual cover-seeking behavior.

Figure 12:
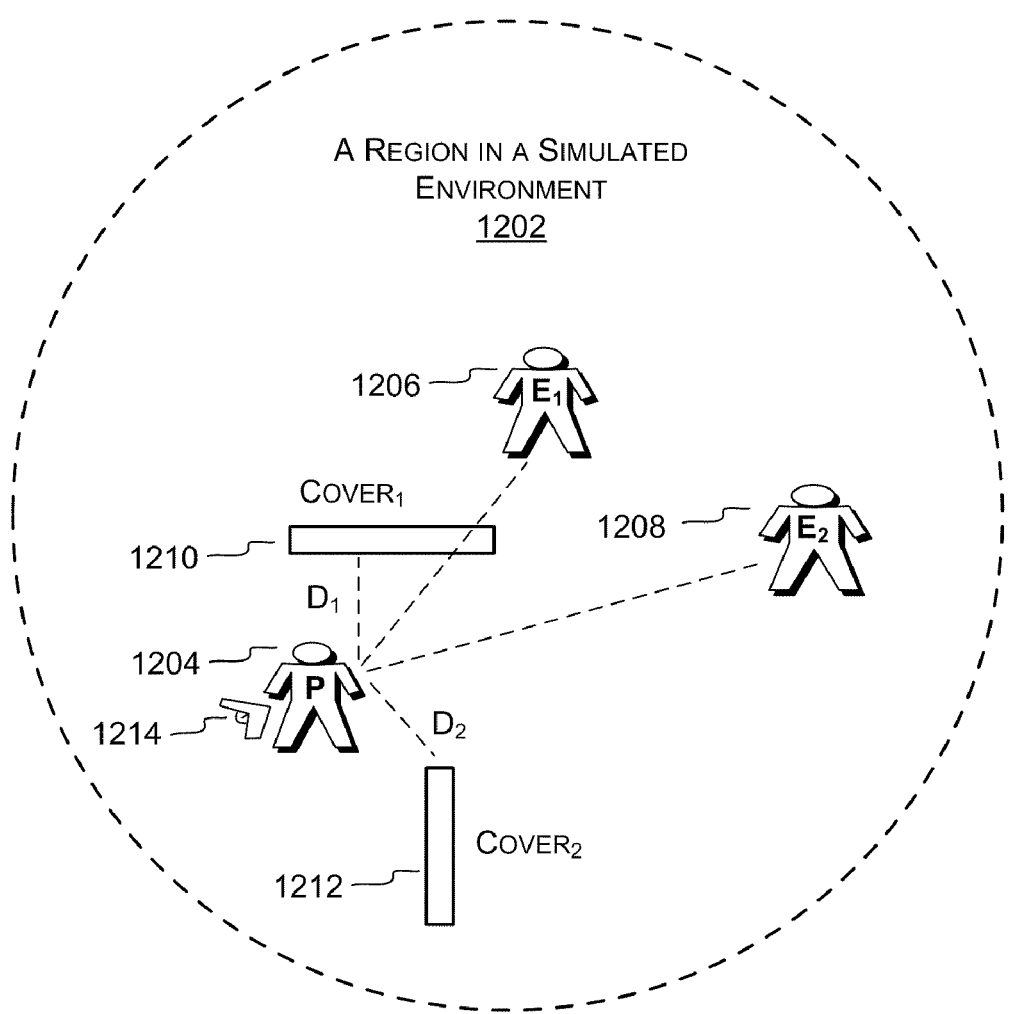
FIG. 12 shows an example of the application of the decision-making module of FIG. 11 to an illustrative region within a simulated environment.

FIG. 12 shows an illustrative hypothetical region 1202 that can be analyzed by the decision-making module 106 of FIG. 11. In this case, the region 1202 includes a player character 1204. The threat analysis module 1102 determines that there are two enemy-type characters (1206, 1208) in the region 1202. The cover analysis module 1104 may determine that there are two potential objects (1210, 1212) that can provide cover to the player character 1204 (e.g., because it is determined that the player character is within a predetermined distance from both object 1210 and object 1212). The player intent analysis module 1106 determines that the player character 1204 intends to use a ranged-type weapon 1214, e.g., because the player character may have unsheathed a ranged-type weapon 1214.

Based on all of these findings, the decision selection module 1108 can determine whether it is appropriate for the player character 1204 to hide behind any one of the objects (1210, 1212). As stated above, the cover analysis module 1104 has determined that the player character 1204 is sufficiently close to both object 1210 and object 1212 to take cover behind either. The decision selection module 1108 may determine that the first object 1210 will provide concealment from the first enemy-type character 1206, but not the second enemy-type character 1208, whereas the second object 1212 provides some level of concealment from both enemy-type characters (1206, 1208). Thus, in this case, the decision selection module 1108 may instruct the player character 1204 to take cover behind the second object 1212. The player character 1204 shows no intent to directly confront the enemy-type characters (since the player character has not drawn a close-quarter-type weapon), so the player character's 1204 actions will not override the decision to take cover. This is merely one representative scenario that demonstrates how the decision selection module 1108 may handle a particular arrangement of threats and objects.

B. Illustrative Processes

Figure 13:
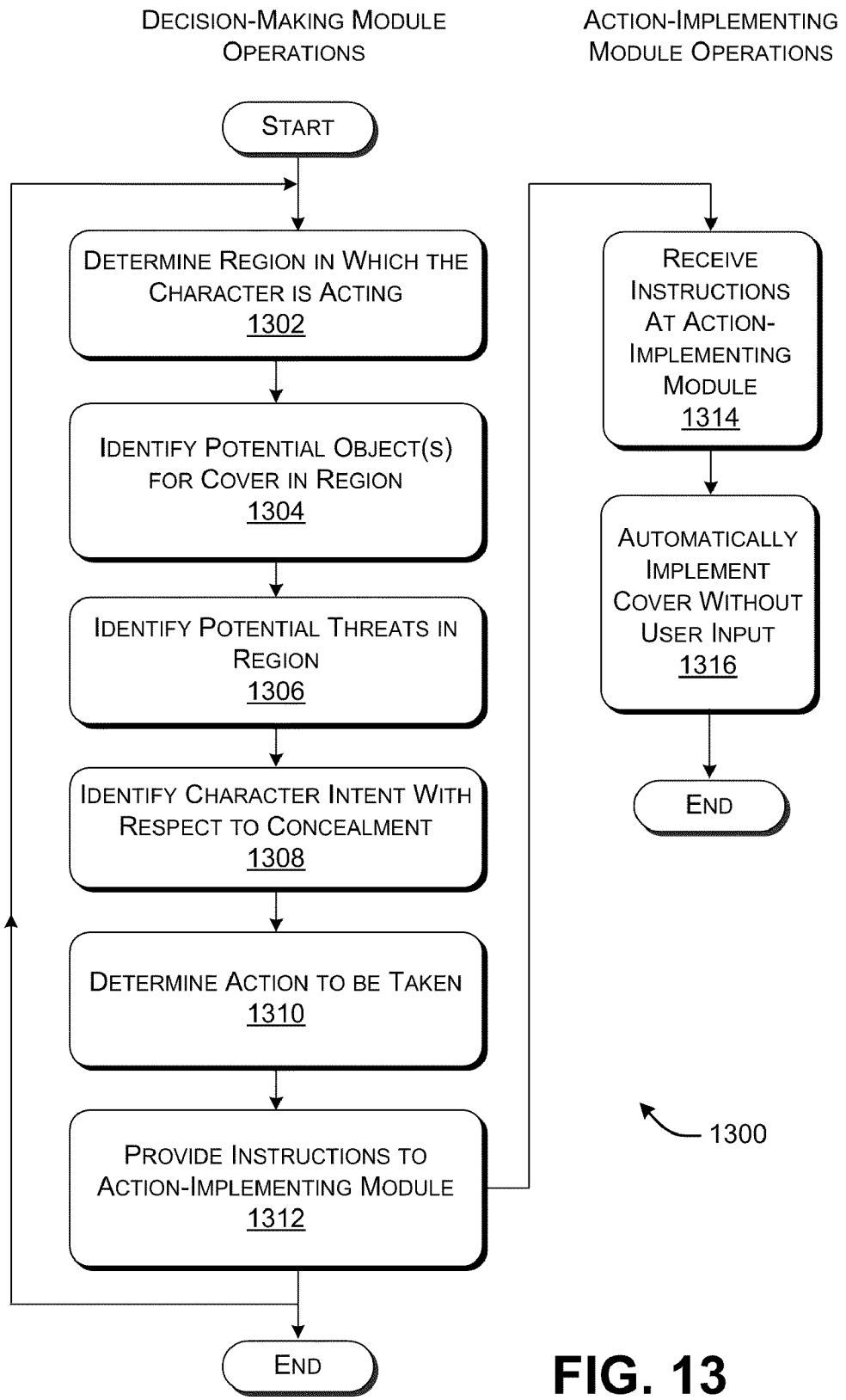
FIG. 13 is an illustrative procedure that provides an overview of one manner of operation of the system of FIG. 1.

FIG. 13 shows a procedure 1300 which provides an overview of the operation of the system 100 of FIG. 1. Since the principles underlying the operation of the system 100 have already been described in Section A, this section will serve as a summary of the operation of the system 100.

In block 1302, the decision-making module 106 determines a region in which the player character is operating within the simulated environment 102.

In block 1304, the decision-making module 106 identifies potential objects that may provide cover to the player character.

In block 1306, the decision-making module 106 identifies potential threats in the region.

In block 1308, the decision-making module 106 identifies the player character's intent with respect to cover, e.g., whether the player character has engaged in any behavior which is inconsistent with a decision to seek cover.

In block 1310, the decision-making module 106 uses the results of analysis performed in blocks 1302-1308 to determine whether it is appropriate to instruct the player character to seek cover or not.

In block 1312, presuming that the foregoing block has been answered in the affirmative, the decision-making module 106 instructs the action-implementing module 108 to implement a cover-seeking behavior.

In block 1314, the action-implementing module 108 receives the decision-making module's 106 instruction to take cover.

In block 1316, the action-implementing module 108 automatically controls the player character to affect the cover-seeking behavior. The cover-seeking behavior may entail crouching, ducking, crawling, leaning against, knelling, and so forth.

FIG. 14 shows an illustrative procedure 1400 which explains, in one scenario, how the decision-making module 106 can make a decision regarding whether or not to seek cover.

In block 1402, the decision-making module 106 determines whether there are any enemy-type characters in a region of interest. If not, as per block 1404, the decision-making module 106 does not instruct the player character to take cover.

In block 1406, the decision-making module 106 determines whether there is at least one object that may provide cover in the region that is sufficiently close to the player object. If not, as per block 1404, the decision-making module 106 does not instruct the player character to take cover.

In block 1408, the decision-making module 106 determines whether the player character has taken an action which reveals its intent to engage in close-quarter-type combat. If so, as per block 1404, the decision-making module 106 does not instruct the player character to take cover.

In block 1410, providing that there is an enemy-type object in the region (as per block 1402) and there is at least one object that may provide cover (as per block 1406) and the player character does not wish to engage in close-quarter combat (as per block 1408) then the decision-making module 106 instructs the player character to seek cover using an identified object.

C. Representative Processing Functionality

FIG. 15 sets forth illustrative electrical data processing functionality or equipment 1500 (simply "processing functionality" below) that can be used to implement any aspect of the functions described above. With reference to FIG. 1, for instance, the type of equipment shown in FIG. 15 can be used to implement any aspect of the system 100. In one case, the processing functionality 1500 may correspond to a general purpose computing device or the like. In another scenario, the processing functionality 1500 may correspond to a game console. For instance, illustrative general purpose hardware that can be configured to implement the functions described herein is described in commonly assigned U.S. Pat. No. 6,862,027 to Jeffrey A. Andrews, et al. Still other types of devices can be used to implement the processing functionality 1500 shown in FIG. 15.

The processing functionality 1500 can include volatile and non-volatile memory, such as RAM 1502 and ROM 1504. The processing functionality 1500 also optionally includes various media devices 1506, such as a hard disk module, an optical disk module, and so forth. More generally, instructions and other information can be stored on any computer-readable medium 1508, including, but not limited to, static memory storage devices, magnetic storage devices, optical storage devices, and so on. The term "computer-readable medium" also encompasses plural storage devices. The term "computer-readable medium" also encompasses signals transmitted from a first location to a second location, e.g., via wire, cable, wireless transmission, etc.

The processing functionality 1500 also includes one or more processing modules 1510 (such as one or more computer processing units, or CPUs). The processing functionality 1500 also may include one or more graphics processing modules 1512 (such as one or more graphic processing units, or GPUs). A graphics processing module performs graphics-related tasks, such as by rendering features of the simulated environment 102 using a three dimensional processing pipeline. In one case, the decision-making module 106 and the action-implementing module 108 can be implemented by a cooperative combination of the processing module(s) 1510 and the graphics processing module(s) 1512, carrying out appropriate instructions stored by any computer-readable medium 1508. Instructions for providing appropriate functions, wherever stored and however executed, are referred to herein as logic configured to provide those functions.

The processing functionality 1500 also includes an input/output module 1514 for receiving various inputs from a user (via input module(s) 1516), and for providing various outputs to the user (via output module(s) 1518). One particular type of input module is a game controller 1520. The game controller 1520 can be implementing as any mechanism for controlling the player character in the simulated environment 102. The game controller 1520 may include various direction-selection mechanisms (e.g., 1522, 1524) for controlling the movement of the player character (such as joy stick-type mechanisms), various trigger mechanisms (1526, 1528) for firing weapons, and so on. One particular output module is a presentation module 1530, such as a television screen, computer monitor, etc.

The processing functionality 1500 can also include one or more network interfaces 1532 for exchanging data with other devices via a network 1534. The network 1534 may represent any type of mechanism for allowing the processing functionality 1500 to interact with any kind of network-accessible entity. The network 1534 can correspond to a wide area network (such as the Internet), a local area network (LAN), a point-to-point connection, or any combination of connectivity mechanisms. The network 1534 can be physically implemented using any combination of hardwired links, wireless links, name servers, gateways, routers, and so on (not shown). The network 1534 can be governed by any protocol or combination of protocols. In one case, the processing functionality 1500 can access a network service (not shown) via the network 1534. The network service can provide gaming functionality. This gaming functionality may optionally allow a player to compete with one or more other remote players. In an alternative implementation, the functions performed by the decision-making module 106 can be executed by the remote gaming functionality, or at least in part by the remote gaming functionality.

One or more communication buses 1536 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for instructing a player character to take cover in a simulated environment, the method being performed by electrical data processing equipment, comprising:
   determining, by the electrical data processing equipment, a presence of a threat within a region of the simulated environment;
   determining, by the electrical data processing equipment, a presence of an object that can provide cover within the region, wherein the object is scenery;
   making a determination, by the electrical data processing equipment, whether it is appropriate for the player character to take cover with respect to the object in response to the threat, based on one or more of:
   the presence of the threat within the region;
   the presence of the object that can provide cover; and
   the determination that the player character's behavior is consistent with the decision to seek concealment; and
   instructing, by the electrical data processing equipment, the player character to automatically take cover using the object, without receiving an express command from a user who controls the player character, wherein the instructing the player character to automatically take cover using the object is performed in response to the determination whether it is appropriate for the player character to take cover with respect to the object in response to the threat.

2. The method of claim 1, wherein the player character responds to the instruction to take cover by taking cover without receiving a manual command from a user who controls the player character.

3. The method of claim 1, wherein the simulated environment is provided by a computerized game.

4. The method of claim 1, wherein said determining the presence of a threat in the region of the simulated environment comprises:
   determining the presence of at least one other character in the region;
   determining whether said at least one other character is a potential enemy to the player character; and
   assessing a presence of a threat if said at least one other character is determined to be a potential enemy.

5. The method of claim 1, wherein said determining the presence of an object comprises determining a distance between the player character and the object, wherein the determination of whether it is appropriate to take cover is based in part on the distance between the player character and the object.

6. The method of claim 1, wherein the determination of whether it is appropriate to take cover is based in part on a determination of whether the player character has been seen by an enemy-type character in the region.

7. The method of claim 1, further comprising:
   receiving a user's command to move the player character while in a cover-posture; and
   in response to the user's command, moving the player character while preserving the cover-posture of the player character.

8. The method of claim 1, wherein an act of taking cover involves changing a posture of the player character in the simulated environment without substantially changing a position of the player character as a whole within the simulated environment.

9. The method of claim 1, wherein the determination of whether it is appropriate to take cover is based in part on a determination of whether the player character has intent to use a weapon.

10. The method of claim 9, wherein it is determined that it is not appropriate to take cover if the player character is determined to have intent to use a close-quarter-type weapon.

11. The method of claim 9, wherein it is determined that it is not inconsistent to take cover if the player character is determined to have intent to use a ranged-type weapon.

12. A system for instructing a player character to take cover in a simulated environment, comprising:
- an electronic data processor;
- an electronic decision-making module executable via the electronic data processor, the electronic decision-making module being configured to determine an action to be taken by the player character, the electronic decision-making module comprising:
  - an electronic threat analysis module configured to determine a presence of a threat within a region of the simulated environment, the threat being posed by a presence of at least one enemy-type character in the region;
  - an electronic cover analysis module configured to determine a presence of an object that can provide cover within the region, wherein the object is scenery; and
  - an electronic decision selection module configured to make a determination whether it is appropriate for the player character to take cover with respect to the object in response to the threat, based on one or more of:
    - the presence of the threat within the region;
    - the presence of the object that can provide cover; and
    - the determination that the player character's behavior is consistent with the decision to seek concealment; and
  - wherein the electronic decision selection module is further configured to provide an instruction that directs the player character to take cover, wherein to provide an instruction that directs the player character to take cover is performed in response to the determination whether it is appropriate for the player character to take cover with respect to the object in response to the threat; and
- an electronic action-implementing module executable via the electronic data processor configured to receive the instruction from the electronic decision-making module, and, in response to the instruction, control the player character to take cover without receiving a command from a user who controls the player character.

13. The system of claim 12, wherein the simulated environment is provided by a computerized game.

14. The system of claim 12, further comprising an electronic player intent analysis module configured to make a determination whether the player character has intent to use a weapon, wherein the electronic decision selection module is configured to make the determination of whether it is appropriate to take cover based in part on the determination of whether the player character has the intent to use the weapon.

15. The system of claim 14, wherein the electronic decision selection module is configured to determine that it is not appropriate to take cover if the player character is determined to have intent to use a close-quarter-type weapon.

16. The system of claim 14, wherein the electronic decision selection module is configured to determine that it is not inconsistent to take cover if the player character is determined to have intent to use a ranged-type weapon.

17. A computer-readable storage medium comprising stored computer-readable instructions providing an electronic decision-making module when executed by one or more processing devices, the computer-readable storage medium comprising one or more of a static memory storage device, a magnetic storage device, an optical storage device, a hard disk module, an optical disk module, volatile memory, non-volatile memory, random access memory (RAM), and read-only memory (ROM), the stored computer-readable instructions comprising:
- threat analysis logic executable by one or more processing devices to determine a presence of a threat within a region of a simulated environment, the threat being posed by a presence of at least one enemy-type character in the region;
- cover analysis logic executable to determine the presence of an object that can provide cover within the region based at least in part on a distance between the player character and the object, wherein the object comprises scenery;
- player intent analysis logic executable to make a determination whether behavior of the player character is consistent with a decision to seek concealment;
- decision selection logic executable to make a determination whether it is appropriate for the player character to automatically take cover with respect to the object in response to the threat, based on one or more of:
  - the presence of the threat within the region;
  - the presence of the object that can provide cover; and
  - the determination that the player character's behavior is consistent with the decision to seek concealment; and
- action-implementing logic executable to control the player character to automatically take cover using the object, without receiving an express command from a user who controls the player character, based on the determination made by decision selection logic whether it is appropriate for the player character to take cover in response to the threat.

18. The computer readable storage medium of claim 17, wherein the simulated environment is provided by a computerized game.

19. The computer-readable storage medium of claim 17, wherein the determination of whether the player character's behavior is consistent with the decision to seek concealment is based on a type of weapon that the player character shows intent of using.

20. The computer-readable storage medium of claim 19, wherein the player intent analysis logic is configured to make a determination that the player character's behavior is inconsistent with the decision to seek concealment if the player character shows intent to use a close-quarter-type weapon.

* * * * *